US008882583B2

(12) United States Patent
Barbalet et al.

(10) Patent No.: US 8,882,583 B2
(45) Date of Patent: Nov. 11, 2014

(54) GAMING SYSTEM, A METHOD OF GAMING AND A GAME OUTCOME PREDICTION CONTROLLER

(75) Inventors: Thomas Samuel Barbalet, Las Vegas, NV (US); Peter Jude Mastera, Henderson, NV (US); Lattamore Osburn, Las Vegas, NV (US); Mark Hripko, Henderson, NV (US); Steven Rood, Henderson, NV (US)

(73) Assignee: Artistocrat Technologies Autralia Pty Limited (AU)

( * ) Notice: Subject to any disclaimer, the term of this patent is extended or adjusted under 35 U.S.C. 154(b) by 0 days.

(21) Appl. No.: 13/246,034

(22) Filed: Sep. 27, 2011

(65) Prior Publication Data

US 2012/0077568 A1 Mar. 29, 2012

Related U.S. Application Data

(60) Provisional application No. 61/387,221, filed on Sep. 28, 2010.

(51) Int. Cl.
*G06F 17/00* (2006.01)
*G07F 17/32* (2006.01)

(52) U.S. Cl.
CPC .................................. *G07F 17/3276* (2013.01)
USPC ............................................................ 463/25

(58) Field of Classification Search
USPC ...................................................... 463/16–25
See application file for complete search history.

(56) References Cited

U.S. PATENT DOCUMENTS

| | | | | |
|---|---|---|---|---|
| 6,089,980 A * | 7/2000 | Gauselmann | 463/27 |
| 7,850,524 B2 * | 12/2010 | Jackson | 463/27 |
| 8,235,797 B2 * | 8/2012 | Chan | 463/20 |
| 2008/0064494 A1 * | 3/2008 | Schneier et al. | 463/29 |
| 2008/0207309 A1 * | 8/2008 | Yoshizawa | 463/25 |
| 2009/0054127 A1 * | 2/2009 | Sweary et al. | 463/42 |
| 2009/0075728 A1 | 3/2009 | Acres | |
| 2009/0121434 A1 | 5/2009 | Baerlocher et al. | |
| 2009/0124316 A1 | 5/2009 | Baerlocher et al. | |
| 2009/0181745 A1 | 7/2009 | Yoshizawa | |
| 2009/0181760 A1 | 7/2009 | Yoshizawa | |
| 2009/0291744 A1 | 11/2009 | Chan | |

(Continued)

FOREIGN PATENT DOCUMENTS

| | | |
|---|---|---|
| CA | 2234681 A1 | 10/1998 |
| CA | 2443301 A1 | 10/1998 |

(Continued)

OTHER PUBLICATIONS

International Search Report in PCT/GB2006/050214, dated Oct. 31, 2006.

*Primary Examiner* — Ronald Laneau
(74) *Attorney, Agent, or Firm* — McAndrews, Held & Malloy, Ltd.

(57) ABSTRACT

An electronic method of gaming. The method includes determining that one or more players of a plurality of linked gaming devices are to participate in a game having a plurality of possible outcomes, receiving at least one player predicted outcome of the possible outcomes from a non-participating player of the plurality of linked gaming devices, conducting the game for each participating player, determining an actual outcome of the game; and determining whether to make an award to one or more non-participating players based on each player predicted outcome and the actual outcome.

27 Claims, 8 Drawing Sheets

(56) References Cited

U.S. PATENT DOCUMENTS

| | | | | |
|---|---|---|---|---|
| 2010/0048302 | A1* | 2/2010 | Lutnick et al. | 463/42 |
| 2010/0124973 | A1 | 5/2010 | Dewaal et al. | |
| 2010/0234085 | A1* | 9/2010 | Kup-Ferroth | 463/16 |

FOREIGN PATENT DOCUMENTS

| | | | |
|---|---|---|---|
| CA | 2341927 | A1 | 9/2001 |
| CA | 2359138 | A1 | 4/2003 |
| CA | 2234681 | C | 12/2003 |
| CA | 2466573 | A1 | 1/2005 |
| CA | 2443301 | C | 8/2009 |
| GB | 2403564 | A | 1/2005 |
| JP | 2005144162 | A | 6/2005 |
| JP | 2005152614 | A | 6/2005 |
| JP | 2005152617 | A | 6/2005 |
| JP | 2008048851 | A | 3/2008 |
| JP | 2009165803 | A | 7/2009 |
| JP | 2009273920 | A | 11/2009 |
| JP | 2009273921 | A | 11/2009 |
| JP | 2010042268 | A | 2/2010 |
| WO | 2004095383 | A1 | 11/2004 |
| WO | 2005027060 | A2 | 3/2005 |
| WO | 2005050411 | A2 | 6/2005 |
| WO | 2005050411 | A3 | 5/2006 |
| WO | 2007010308 | A1 | 1/2007 |
| WO | 2005027060 | A3 | 8/2007 |
| WO | 2008011089 | A2 | 1/2008 |
| WO | 2008051811 | A2 | 5/2008 |
| WO | 2008011089 | A3 | 11/2008 |
| WO | 2008051811 | A3 | 11/2008 |

* cited by examiner

GAMING SYSTEM, A METHOD OF GAMING AND A GAME OUTCOME PREDICTION CONTROLLER

RELATED APPLICATIONS

This application claims priority to U.S. Provisional Application No. 61/387,221, having a filing date of Sep. 28, 2010, which is also incorporated herein by reference in its entirety.

BACKGROUND OF THE INVENTION

The present invention relates to a gaming system, a method of gaming and a game outcome prediction controller.

In some gaming systems, a player of an individual gaming machine can qualify to play a bonus game conducted by another gaming apparatus. For example, a particular gaming outcome may entitle the player to the bonus game which the player may win or lose, or in some examples, will always win but at different levels.

In other gaming systems a plurality of players may qualify to play a bonus game where players compete against one another, with one or more players receiving an award based on their placing in the bonus game.

While such gaming systems provide players with enjoyment, a need exists for alternative gaming systems in order to maintain or increase player enjoyment.

BRIEF SUMMARY OF THE INVENTION

In a first aspect, the invention provides an electronic method of gaming comprising:

determining that one or more players of a plurality of linked gaming devices are to participate in a game having a plurality of possible outcomes;

receiving at least one player predicted outcome of the possible outcomes from a non-participating player of the plurality of linked gaming devices;

conducting the game for each participating player;

determining an actual outcome of the game; and determining whether to make an award to one or more non-participating players based on each player predicted outcome and the actual outcome.

In an embodiment, the game is a linked game and each linked gaming device is operable to play a base game.

In an embodiment, each linked gaming device is operable to play the same base game.

In an embodiment, the method comprises initiating the linked game in response to a trigger event.

In an embodiment, where two players are determined to participate in the game and any other players of the linked gaming devices are eligible to predict which of the participating players will win the game.

In an embodiment, the method comprises applying an eligibility criteria to all players of the plurality of linked gaming devices, determining that all eligible players are to participate and that all ineligible players are non-participating players able to select a player predicted outcome for the game.

In an embodiment, an award is made in respect of each predicted outcome which matches the actual outcome.

In an embodiment, the method comprises:

receiving a bet amount in respect of each player predicted outcome; and making any award based on the bet amount.

In an embodiment, non-participating players may only select a predicted outcome before the game is conducted.

In an embodiment, the method comprises allowing a predicted outcome to be made during at least part of conduct of the game.

In an embodiment, the method comprises varying the award based on the progress of the game when the predicted outcome was made.

In a second aspect, the invention provides a gaming system comprising:

a linked game controller arranged to:

determine that one or more players of a plurality of linked gaming devices are to participate in a game having a plurality of possible outcomes; and conduct the game for the participating players in order to determine an actual outcome; and a game outcome prediction controller arranged to:

receive at least one player predicted outcome of the possible from a non-participating player of the plurality of linked gaming devices; and determine whether to make an award to one or more non-participating players based on each player predicted outcome and the actual outcome.

In an embodiment, the plurality of linked gaming devices and wherein the game is a linked game and each linked gaming device is operable to play a base game.

In an embodiment, each linked gaming device is operable to play the same base game.

In an embodiment, the gaming system is arranged to initiate the linked game in response to a trigger event.

In an embodiment, two players are determined to participate in the game and any other players of the linked gaming devices are eligible to predict which of the participating players will win the game.

In an embodiment, the gaming system comprises a participation module arranged to apply an eligibility criteria to all players of the plurality of linked gaming devices, determine that all eligible players are to participate and that all ineligible players are non-participating players able to select a player predicted outcome for the game.

In an embodiment, the game outcome prediction controller is arranged to make an award in respect of each predicted outcome which matches the actual outcome.

In an embodiment, the game outcome prediction controller is arranged to:

receive a bet amount in respect of each player predicted outcome; and make any award based on the bet amount.

In an embodiment, the game outcome prediction controller is arranged such that non-participating players may only make a predicted outcome before the game is conducted.

In an embodiment, the game outcome prediction controller is arranged such that non-participating players may make a predicted outcome during at least part of conduct of the game.

In an embodiment, the game outcome prediction controller is arranged to vary the award based on the progress of the game when the predicted outcome was made.

In a third aspect, the invention provides a game outcome prediction controller for a gaming system, the game outcome prediction controller arranged to:

receive at least one player predicted outcome from a non-participating player of a plurality of linked gaming devices of a game in which one or more players of the plurality of linked gaming devices participate, the game having a plurality of possible outcomes which can be predicted; and determine whether to make an award to one or more non-participating players based on each player predicted outcome and an actual outcome of the game.

In an embodiment, the game outcome prediction controller is arranged to make an award in respect of each predicted outcome which matches the actual outcome.

In an embodiment, the game outcome prediction controller is arranged to:

receive a bet amount in respect of each player predicted outcome; and make any award based on the bet amount.

In an embodiment, the game outcome prediction controller is arranged such that non-participating players may only make a predicted outcome before the game is conducted.

In an embodiment, the game outcome prediction controller is arranged such that non-participating players may make a predicted outcome during at least part of conduct of the game.

In an embodiment, the game outcome prediction controller is arranged to vary the award based on the progress of the game when the predicted outcome was made.

In a fourth aspect, the invention provides computer program code which when executed implements the above method.

In a fifth aspect, the invention provides a tangible computer readable medium comprising the computer program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Overview of an Example Gaming System

Figure 1:
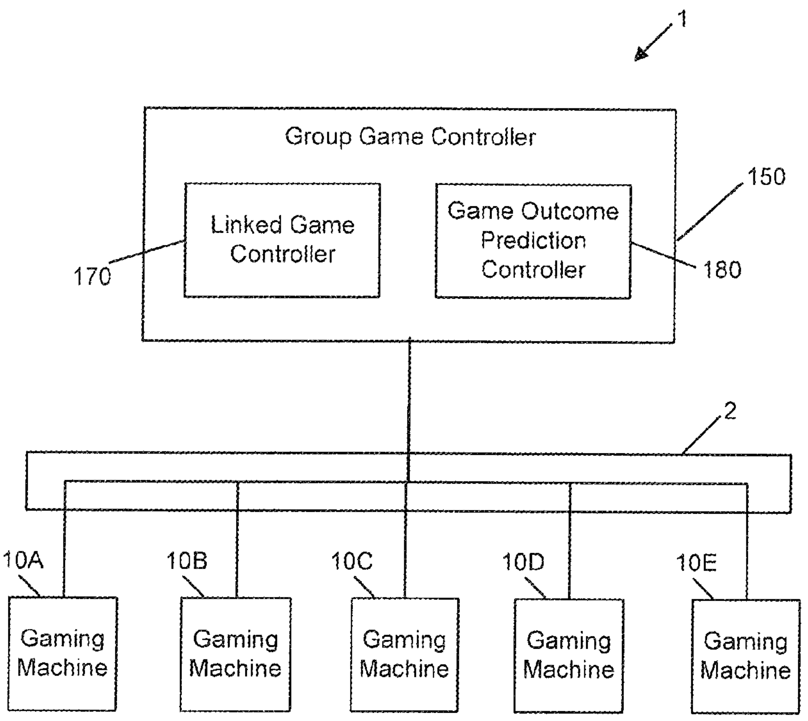
FIG. 1 is a block diagram of a gaming system with a linked game controller.

FIG. 1 shows a gaming system 1 of one embodiment where a group game controller 150 is in data communication over a network 2, such as an Ethernet, with a bank of five gaming devices in the form of standalone gaming machines 10. The group game controller 150 implements a linked game controller 170 and a game outcome prediction controller 180. When a linked game is triggered, the group game controller 150 is arranged to communicate with the gaming machines to determine the identity of the gaming machine or machines which are participating to thereby determine which players will participate. The linked game controller 150 implements a linked game where participating players of the plurality of gaming devices 10 may achieve one or a plurality of possible outcomes. In parallel, game outcome prediction controller 180 enables one or more non-participating players of the linked gaming devices to make a prediction of the outcome and receive an award for the prediction. In this way non-participants in the linked game can take a more active interest in the linked game.

Gaming Devices

Gaming devices capable of participating in the method of gaming of the embodiment can take any suitable form including stand alone gaming machines and server based gaming terminals.

Figure 2:
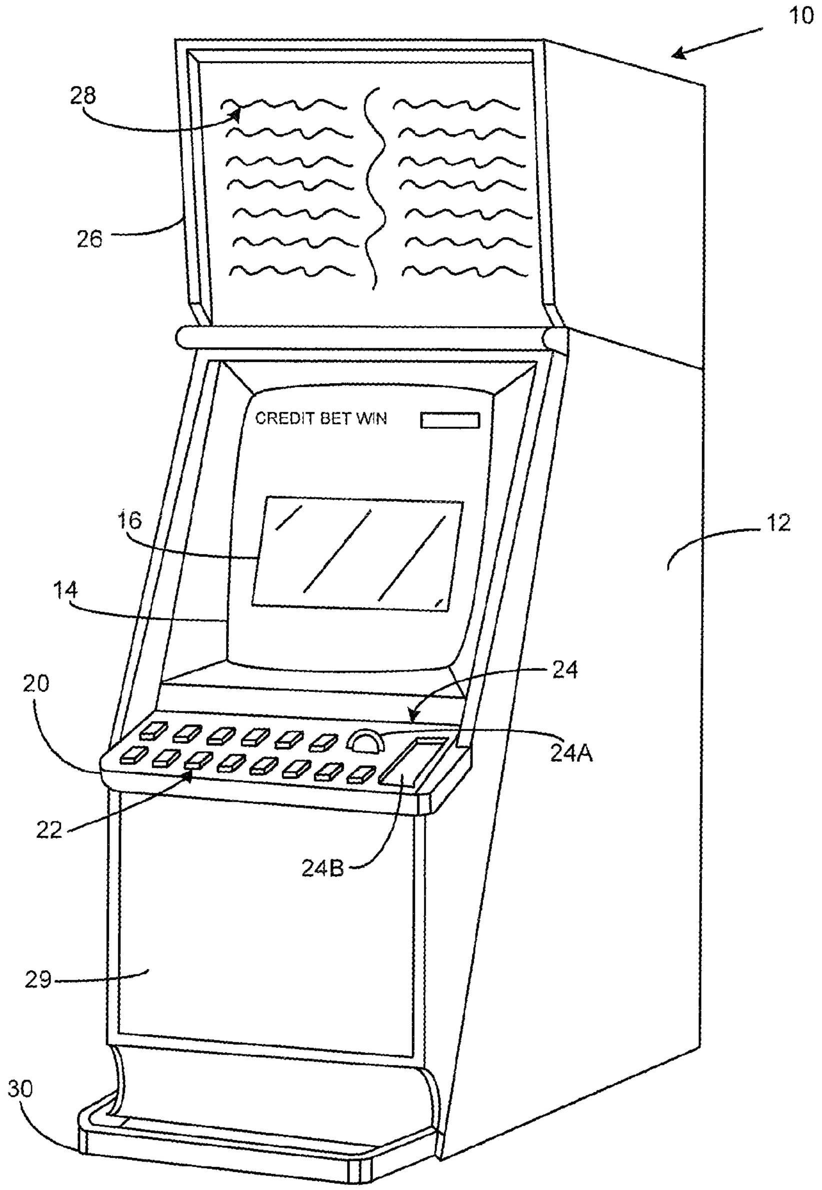
FIG. 2 is a perspective view of a stand alone gaming machine.

A gaming device in the form of a gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
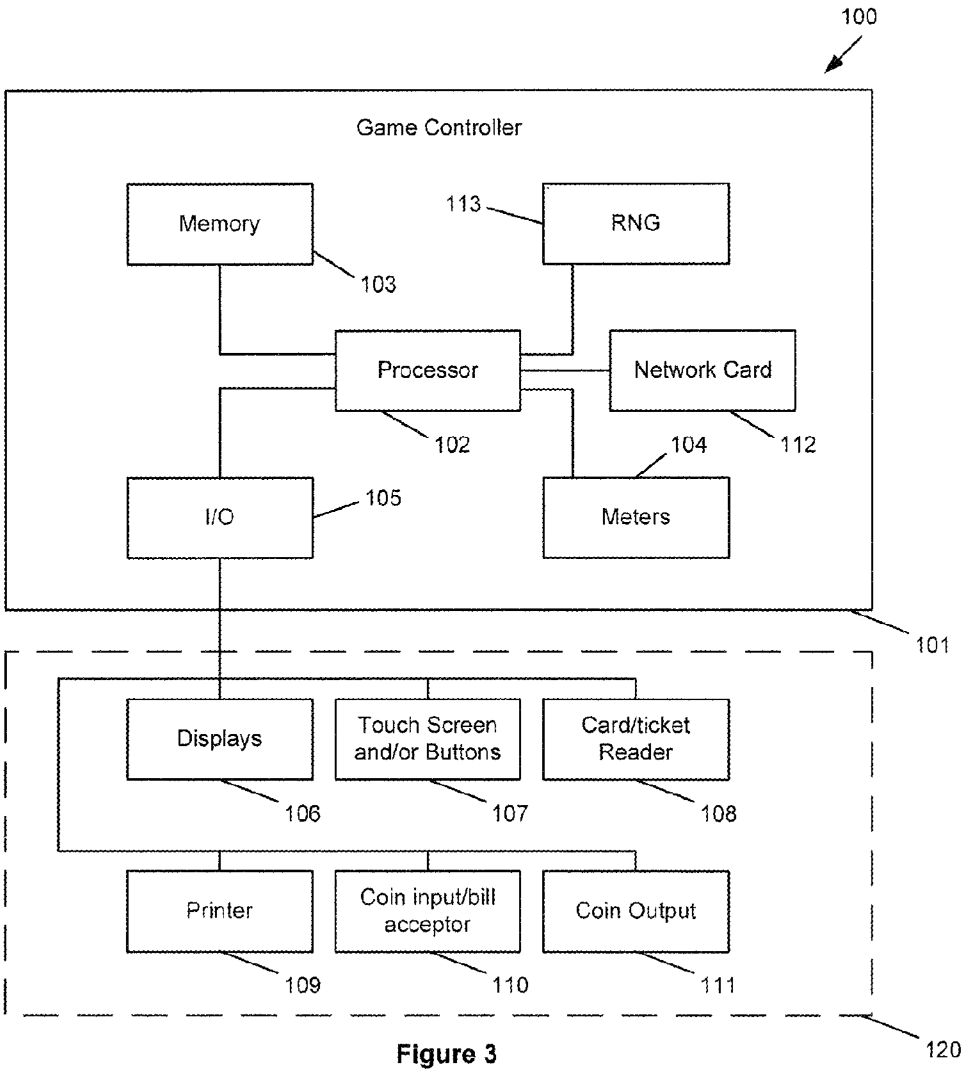
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used, such as a mechanical pull handle.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
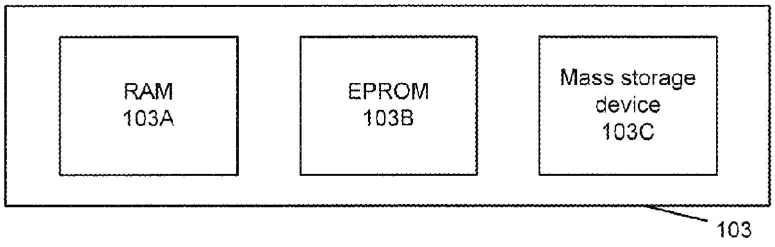
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a client/server gaming architecture can be found in WO 2006/052213 and PCT/SE2006/000559, the disclosures of which are incorporated herein by reference. In such an embodiment, a linked game controller can be provided, for example, by a dedicated server in data communication with the game server.

Figure 5:
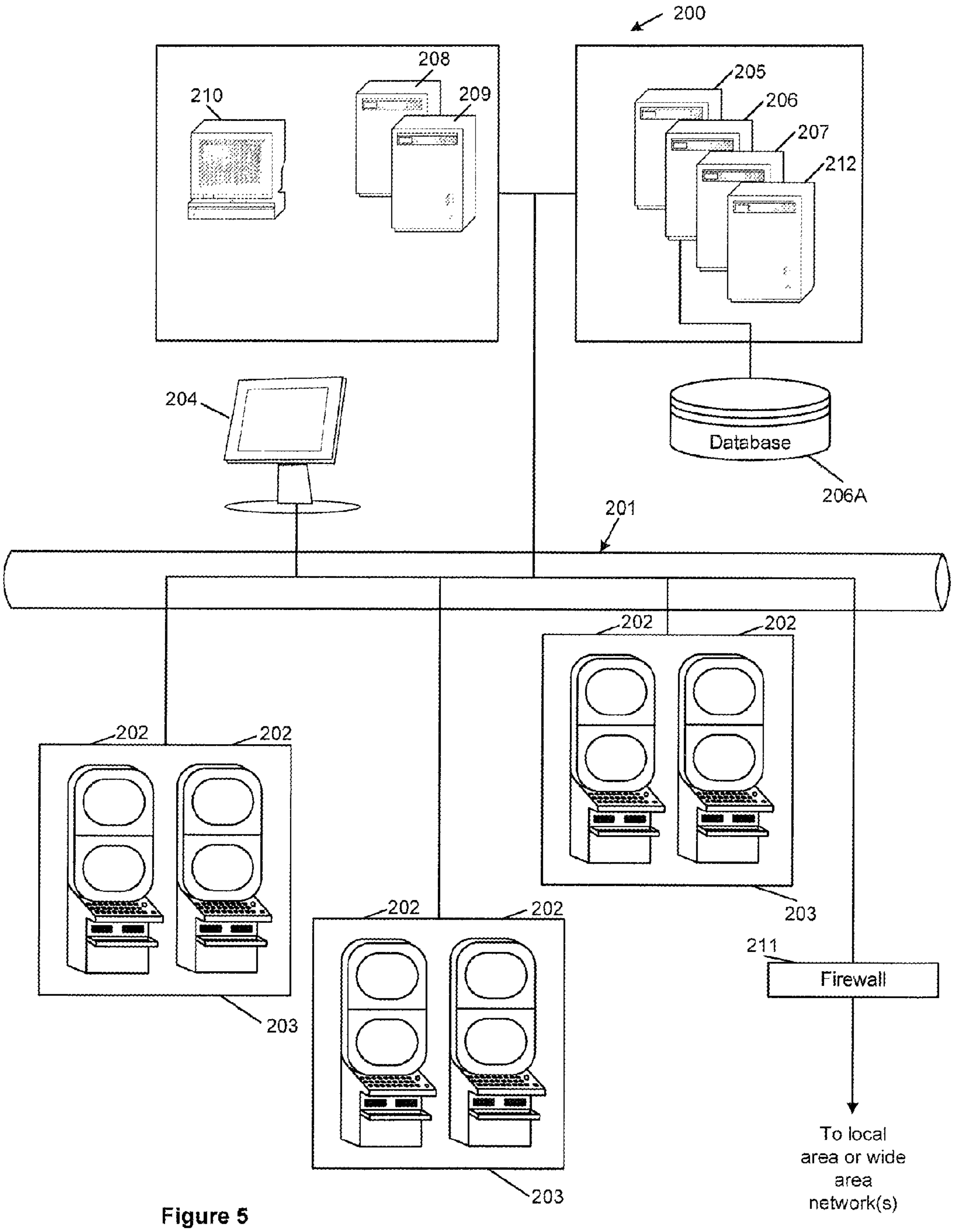
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

A linked game controller can be provided within such a network 200 by linked game server 205, such that the linked game server may implement a linked game for a plurality of different banks of gaming machines rather than a specific controller being provided for each bank of gaming machines.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Figure 9:
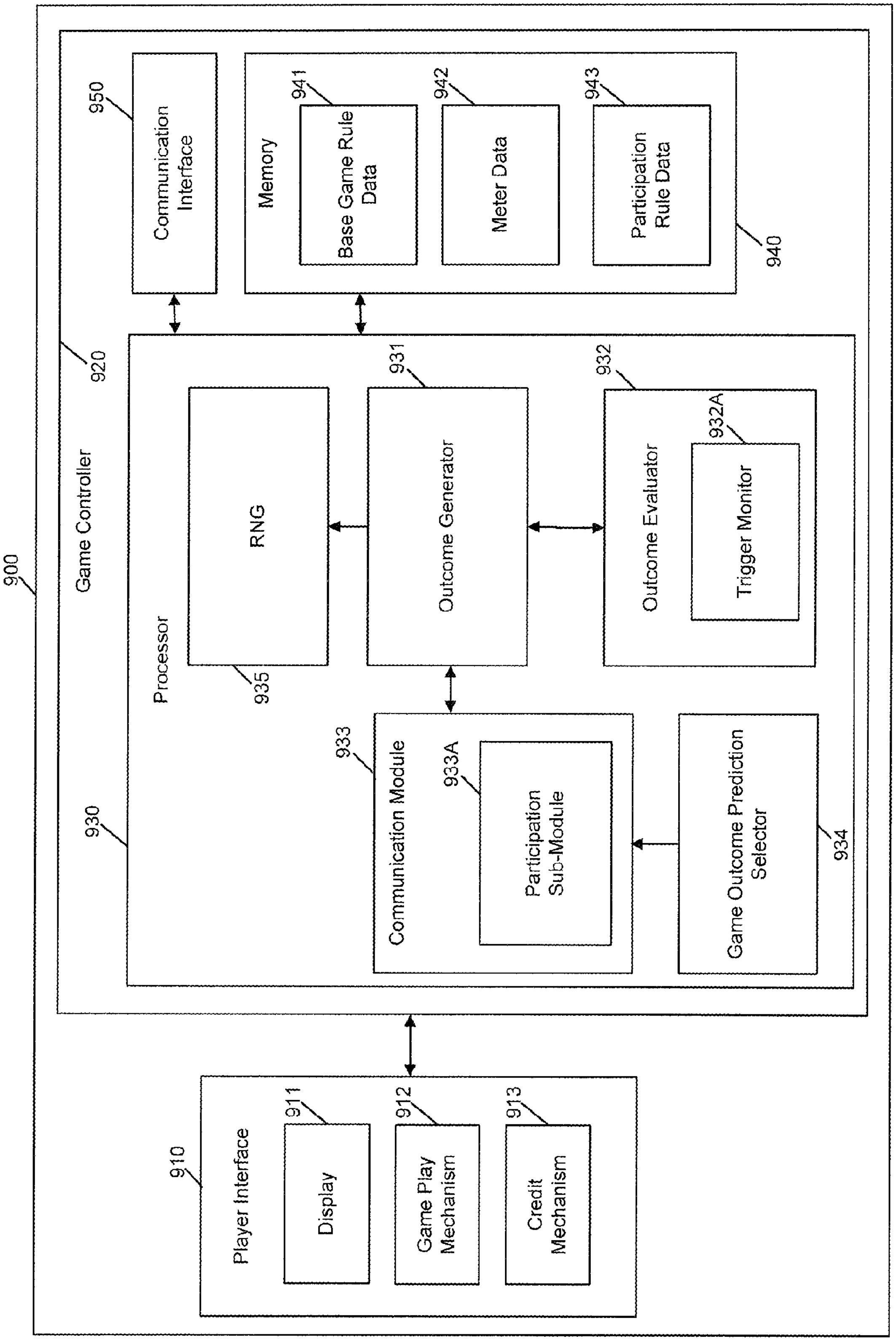
FIG. 9 is a functional block diagram of a gaming device in the form of a standalone gaming machine.

FIG. 9 is a functional block diagram of a gaming device in the form of a stand alone gaming machine 900. The gaming machine 900 may be the same or different to gaming machine 10, 100 described above. In FIG. 9, the processor 930 of game controller 920 is shown implementing a number of modules based on program code and data stored in memory 940. Persons skilled in the art will appreciate that various of the modules could be implemented in some other way, for example by a dedicated circuit.

The gaming device 900 includes a player interface 910 having a display 911 for displaying game outcomes to a player and a game play mechanism 912 including input devices such as touch screen or buttons to enable the player to interact with the game by placing wagers and entering any other instructions required to play the game. Game play mechanism 912 also enables the player to interact with the game to learn game rules etc. The player interface 910 includes a credit mechanism 913 allowing the player to input credit into the gaming device 900 and/or be paid out any winnings or remaining credit. A person skilled in the art will appreciate that other components will be present in a gaming device 900 such as those described in relation to FIGS. 2 to 4 above. The memory 940 includes program code for implementing a game including base game rule data 941 for implementing the rules of a base game.

The processor 930 when executing the program code stored in memory 940 is arranged to generate outcomes of the game in response to the operation of the game play mechanism 912. The outcomes are generated with the outcome generator 931. The outcome evaluator 932 evaluates the game outcomes that are generated based on the wager specified with the game play mechanism 912 and updates meter data 942 which stores a credit meter and a win meter for the game. The processor 930 also implements a communication module 933 which is intended to communicate by communication interface 950 with a linked game controller. As will be described in further detail below the communication module 933 is arranged to communicate with the group game controller 150 as necessary as described in further detail below.

In one embodiment, the game played on the individual gaming machine 800 is a conventional spinning reel game. The player places a wager with game play mechanism 912 by selecting an amount to wager and making a selection of how many win lines to play to establish an evaluation entitlement. Such win lines are typically formed by a combination of symbol display positions, one from each reel, the symbol display positions being located relative to one another such that they form a line.

In many games, the entitlement is not strictly limited to the selected win lines for example, "scatter" pays are awarded independently of a players selection of pay lines and are an inherent part of the evaluation entitlement.

Persons skilled in the art, will appreciate that in other embodiments, an evaluation entitlement may be based on a number of reels to play such as in games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Once the game controller 920 establishes the evaluation entitlement, outcome generator 931 generates a game outcome to be evaluated which is displayed on display 911 by selecting symbols for display from a plurality of symbol sets corresponding to respective ones of a plurality of spinning reels. The symbol sets can specify a sequence of symbols for each reel such that the outcome generator 931 can select all of the symbols by selecting a stopping position in the sequence using random number generator 935. In one example, three symbols of each of five reels may be displayed such that symbols are displayed at fifteen display positions on display 911. It is known to use a probability table stored in memory 940 to vary the odds of a particular stop position being selected. Other techniques can be used to control the odds of particular outcomes occurring to thereby control the return to player of the game.

Accordingly, as described above, at the completion of the outcome generation process controlled by the outcome generator 931 a plurality of symbols are displayed at display positions on display 911. The previously determined evaluation entitlement is applied by the outcome evaluator 932. It is determined whether any awards should be made based on game rule data 941—for example whether the symbols of the display positions of an active win line correspond to designated symbol combinations in a pay table.

The outcome evaluator 932 has a trigger monitor 932 A arranged to determine based on the base game rule data 941 whether a trigger condition has been met. The trigger condition can be one of any known trigger condition in the art such as a particular symbol combination being achieved in the underlying base game.

Linked Game Controller and its Operation within the Gaming System

Figure 6:
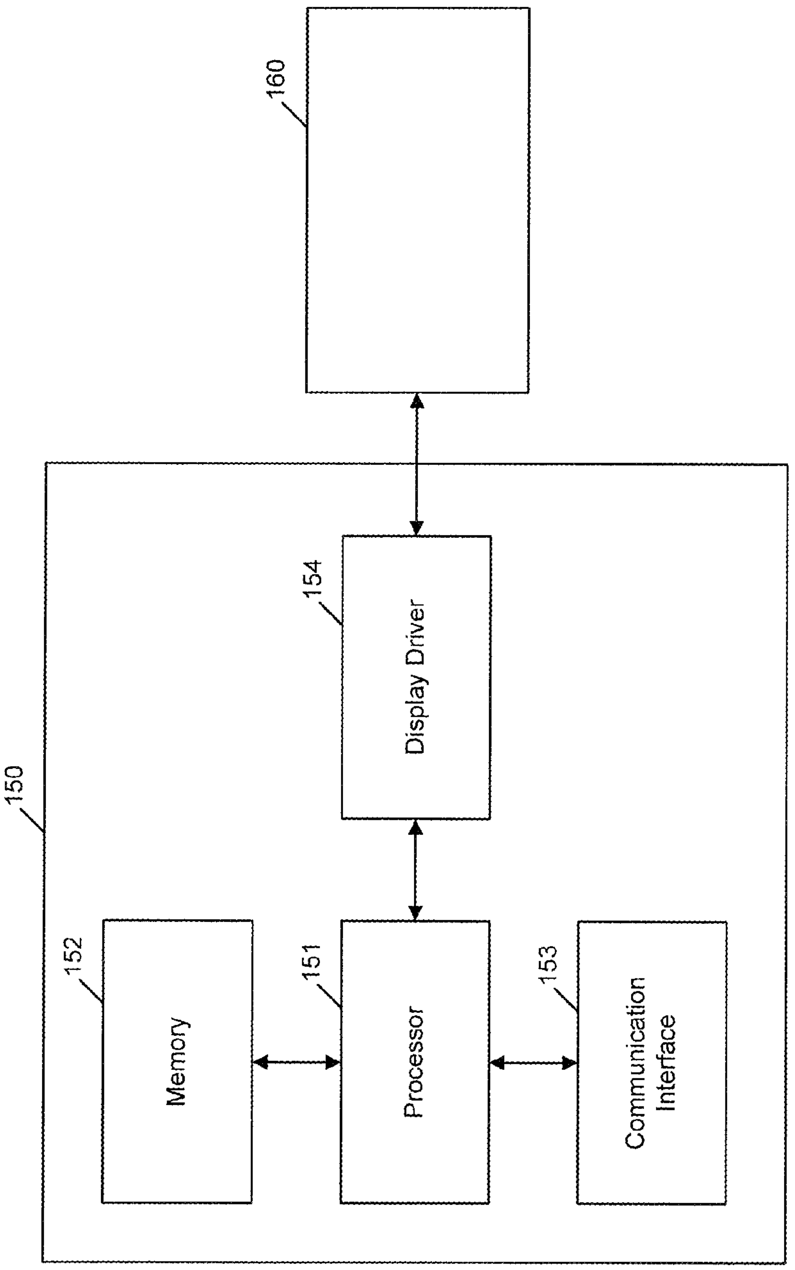
FIG. 6 is a block diagram of a linked game controller.

Referring to FIG. 6 there is shown further detail of the linked game controller 150. From FIG. 6 it will be apparent that linked game controller 150 is in data communication with a communal display 160 on which game outcomes can be displayed to the players playing the bank of gaming machines 10 shown in FIG. 1. In other embodiments, the gaming outcomes could be displayed on a top box of the individual gaming machines 10, rather than being displayed on a communal display, or in addition to such a display 160.

Referring to FIG. 6, the constitution of the linked game controller 150 is similar to that of the gaming device illustrated in relation to FIGS. 2 to 4 and 9 in that it has a processor 151 arranged to implement the linked game based on program code stored in memory 152 and a display driver 154 for driving the display 160 to show the linked game outcome. The linked game controller 150 also includes a communication interface 153 which is designed to enable the processor 151 to communicate with each of the gaming devices 10.

Persons skilled in the art will appreciate the above components are the core components for implementing a linked game but other components may be present in a linked game controller. Persons skilled in the art will appreciate that the implementation of the linked game controller is analogous to the implementation of bonus controllers in existing gaming systems and reference may be made to such bonus controllers for further details of implementation.

Figure 7:
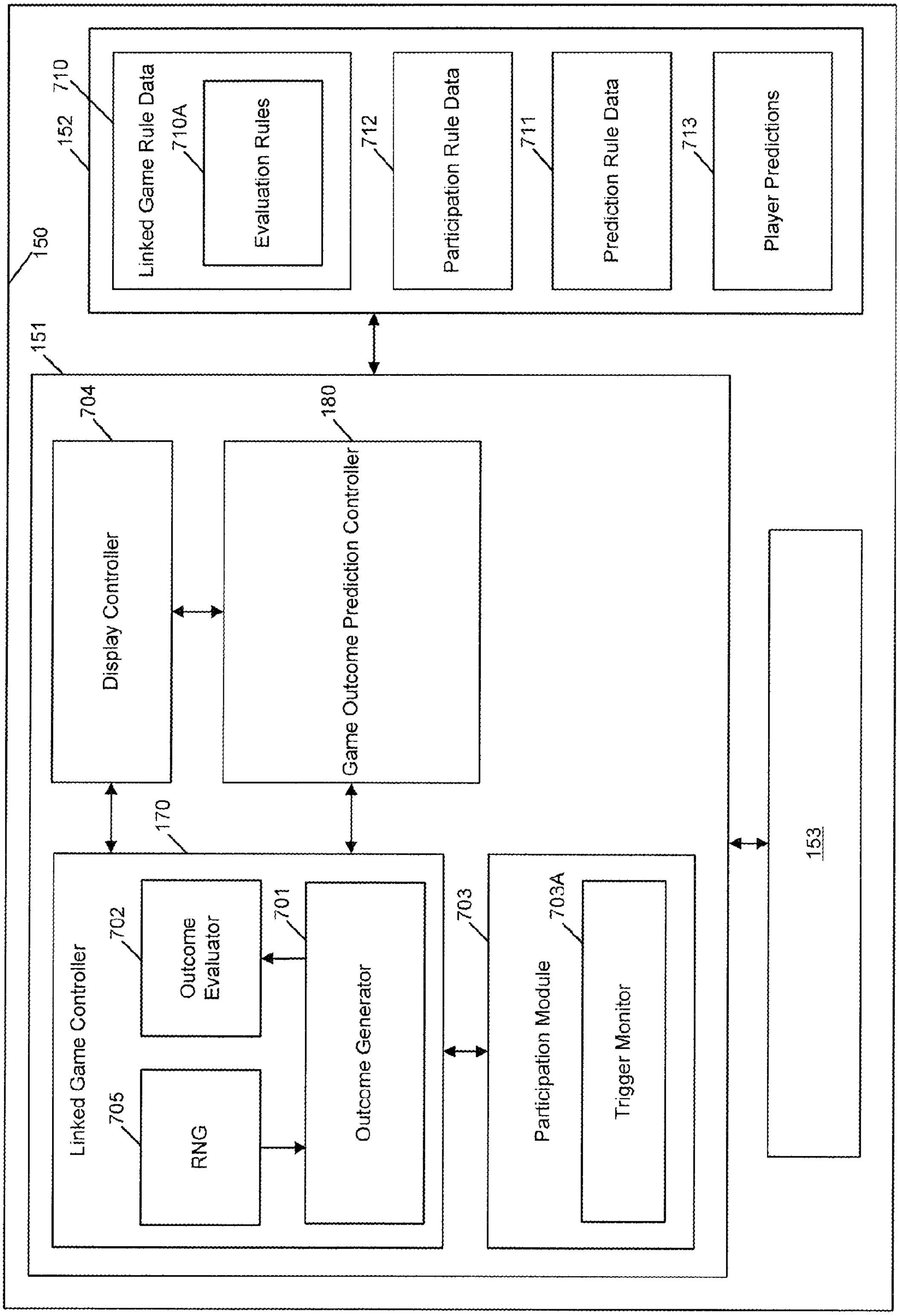
FIG. 7 is a functional block diagram of a linked game controller.

FIG. 7 is a functional block diagram of the linked gaming controller 150 which shows that the processor 151 implements a number of modules in a similar manner to the processor of the gaming device shown in FIG. 9. The processor executes program code stored in memory 152 to instantiate a participation module 703 which communicates via data communication interface 153 with each of the gaming devices. The participation module 703 determines based on participation rule data 712 which one or more of gaming machines which are to participate in the linked game after the linked game has been triggered. That is, participation rule data 712 may specify how often the participation module should poll individual gaming machines or the time period within which the gaming machines need to have last indicated that they are active in order to participate in the game outcome.

Figure 8:
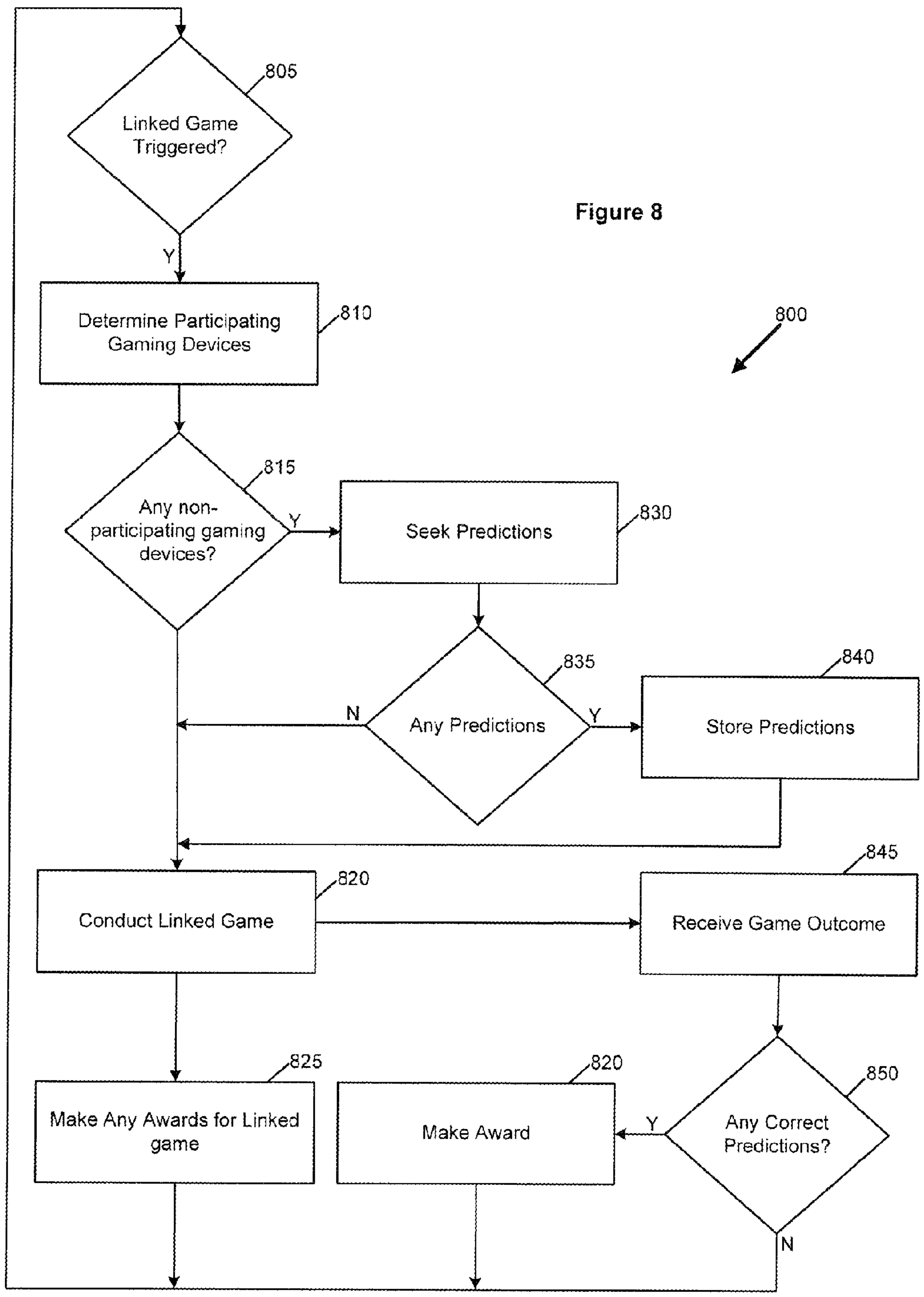
FIG. 8 is a flow chart of an embodiment.

In the specific example shown in FIG. 8, the participation module 703A includes a trigger monitor 703 which is designed to monitor for receipt of a trigger signal from one of the gaming devices. When the trigger is received by the trigger monitor 703A, participation module 703 determines which of the gaming machines 10, 800 are to be participants in the linked game (and hence which players will participate). The gaming machines which are to participate vary depending on the implementation. In one embodiment, only the gaming device which triggered the game participates. In another embodiment, each gaming device on which a qualifying wager has been made in a defined period participates. In this embodiment, participation module 703 polls each of the gaming devices to determine if they are eligible. The participation sub-module 933A of each gaming device 900 outputs whether they are eligible at the time based on the participation rule data 943 as well as data allowing the gaming machine to be identified. From these responses, participation module 703 determines the identity and number of participating gaming machines. In another embodiment, the participation module randomly selects another gaming machine in addition to the triggering gaming machine. In another embodiment, the trigger monitor 703A waits until two gaming machines have generated a trigger before starting the linked game and the two gaming machines which generate a trigger participate.

The linked game can take a number of different forms provided the form of the game provides at least two possible outcomes which can be predicted. For example, if the linked game is provided to a single participant, the possible outcomes could be whether the player wins or loses or whether the prize award is above or below a certain level. Similarly, if there are two or more participants, the possible outcomes could relate to the placing of the participants in the linked game or to whether the total prizes awarded in the linked game are above or below a certain level. Persons skilled in the art will appreciate that the concept can be extended to more participants and/or in order to define a greater number of possible outcomes. In one example, where there are two players, a spinning reel game similar like the base game is conducted for each player. Each player receives any award resulting from the spinning reel game and the player who receives the largest award is declared the winner and is awarded an additional prize. Thus, the possible outcomes are that the first player will win or the second player will win. In other embodiments, such as those where a single player plays the linked game, the predictions may be in respect of an amount of credits one for the linked game. In such embodiments an award may be made, for example, for one or more of the closest prediction, predictions within a tolerance or for an exact prediction.

In the embodiment, the participation module 703, in addition to determining which gaming machines will participate, determines which game machines will not participate (and hence which players will not participate) and such that the identity of the non-participating gaming machines is available to a game outcome prediction controller 180. The game outcome prediction controller determines the available predictions based on prediction rule data 711 and communicates the available predictions to the individual gaming devices. At the individual gaming devices 900, a game outcome prediction selector 934 is arranged to display the possible game outcomes to the player on the display 911. The player can then make a prediction, for example a selection of available predictions, by operating the game play mechanism 912. In the embodiment, the selection is made in exchange for an additional wager made with the game play mechanism 912 based on credits established on credit meter in meter data 942. In other embodiments, the prediction may be made without a wager being made. In the embodiment, the prediction selector 934 presents the available selections of game outcomes together with odds associated with those game outcomes. Should the prediction be correct, the player will be provided with an award based on the odds and they amount they wager. In another embodiment, awards are predefined and stored in prediction rule data.

In a further embodiment, some aspect of play of the gaming device 900, controls whether player is entitled to predict an outcome. For example, the player may be allowed to predict an outcome if they have placed a certain type of bet.

Once the player makes their selection, the communication module 933 communicates data representing the player prediction (including the amount wagered) the game outcome and the identity of the gaming machine to the game outcome prediction controller 180 of the group game controller 150. Game outcome prediction controller 150 stores the player prediction 713 in memory. In some embodiments, the interface of another device present at the gaming machine may be used to enter the prediction such as a player marketing module (also known as a player tracking module), for example so that a player can make a prediction without interrupting their own play.

In the embodiment, once the game outcome prediction controller 180 has either received predictions from each non participating gaming machine 900 or has allowed for a sufficient time period to elapse, the linked game controller 170 begins the linked game. In the embodiment, the outcome generator 701 of the linked game controller 170 generates a linked game outcome using a number obtained from random number generator 705 and linked game rule data 710. This outcome is then evaluated in accordance with the evaluation rule 701A by the outcome evaluator 702. The game outcome prediction controller 180 determines from the evaluated outcome which of the possible outcomes has occurred. The game outcome prediction controller 180 then compares this actual outcome to the player predictions 713. If one or more player predictions 713 match the actual outcome, the game outcome prediction controller 180 communicates via communication interface 153 with the gaming device 900 to advise the game controller 930 or the individual gaming device to make the award.

In a variation of this embodiment, where the game play is of sufficient length, for example extended over a number of different game rounds involving partial generations of game results by the outcome of a outcome generator 701, the game outcome prediction controller 180 may offer players the opportunity to continue to place wagers during the play of the linked game until such time where the outcome becomes apparent. In such embodiments, the game outcome prediction controller 180 may be arranged to vary the odds in accordance with the partial outcome of the game.

Persons skilled in the art will appreciate that while the above example describes the linked game being triggered, the linked game could instead be carried out periodically with each gaming device that played in a previous time period being entitled to participate in the linked game. The trigger event may be, in addition to a symbol combination in the game, occurrence of a specific symbol in the game, purchased, be caused by another connected system, based on turnover, based on a random evaluation, etc.

The method of embodiment is summarised in FIG. 8 which shows that the method 800 involves monitoring 805 as to whether the linked game is triggered. When a linked game is triggered, the method involves determining 810 participating gaming devices. The method then involves determining 815 whether there are any non participating game devices. When it is determined that there are non participating gaming devices, the method involves seeking predictions 830. If there are any predictions 835, the predictions they are stored 840.

In one embodiment, the linked game is then conducted 820 and if there were predictions that the game outcome was received and it is determined whether there are any correct predictions 850. If there are correct predictions that the relevant award 855 is made. In addition, any awards for the linked game are also made 845 after the linked game has been conducted.

Further aspects of the method will be apparent from the above description of the system. It will be appreciated that at least part of the method will be implemented electronically, for example digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor, for example, an application specific integrated circuit (ASIC) or a field programmable gate array (FPGA).

It will be understood to persons skilled in the art of the invention that many modifications may be made without departing from the spirit and scope of the invention, in particular it will be apparent that certain features of embodiments of the invention can be employed to form further embodiments.

For example, the linked game controller 150 is shown in FIG. 1 as a separate entity to the gaming devices 10. In an alternative embodiment, it could be provided by one of the gaming devices incorporating a server module arranged to implement the linked game controller in the manner described in Australian patent application 2008205413 filed 13 Aug. 2008.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic method of gaming for use with a gaming system configured to play a game having a plurality of possible outcomes, said gaming system having a plurality of linked gaming devices and a controller, the method comprising:

receiving via the controller a first trigger signal from a first of a plurality of linked gaming devices and a second trigger signal from a second of said plurality of linked gaming devices;

in response to receiving both said first trigger signal and said second trigger signal, triggering via the controller said game;

determining via the controller which gaming devices of said plurality of linked gaming devices are to participate in said game so as to provide participating gaming devices which participate in said game and non-participating gaming devices which do not participate in said game;

receiving via the controller from at least one of said non-participating gaming devices of said plurality of linked gaming devices at least one predicted outcome of said possible outcomes of said game;

conducting via the controller said game for each participating gaming device;

determining via the controller an actual outcome of said game; and determining via the controller whether to make an award to one or more non-participating gaming devices based on said at least one predicted outcome and the actual outcome of said game.

2. A method as claimed in claim 1, wherein the game is a linked game and each linked gaming device is configured also to play a base game.

3. A method as claimed in claim 2, wherein each linked gaming device is configured to play the same base game.

4. A method as claimed in claim 1, and further comprising said non-participating devices predicting which of the participating devices will win the game.

5. A method as claimed in claim 1, and further comprising applying an eligibility criterion to all devices of the plurality of linked gaming devices, and determining that all eligible gaming devices are to participate in said game and that all ineligible gaming devices are non-participating gaming devices being able to provide to said controller a predicted outcome for the game.

6. A method as claimed in claim 1, and further comprising making an award in respect of said at least one predicted outcome matching the actual outcome of said game.

7. A method as claimed in claim 1, and further comprising:

receiving a bet amount in respect of said at least one predicted outcome from at least one non-participating gaming device; and making an award based on the bet amount.

8. A method as claimed in claim 1, and further comprising selecting at least one predicted outcome by at least one of said non-participating devices before the game is conducted.

9. A method as claimed in claim 1, and further comprising allowing a predicted outcome to be made during the game.

10. A method as claimed in claim 9, and further comprising varying the award based on the progress of the game when the predicted outcome was made.

11. A gaming system comprising:

a plurality of linked gaming devices;

a linked game controller configured to:

receive (1) a first trigger signal from a first of said linked gaming devices, and (2) a second trigger signal from a second of said linked gaming devices;

in response to receiving both said first trigger signal and said second trigger signal, trigger a game having a plurality of possible outcomes;

determine which gaming devices of said plurality of linked gaming devices are to participate in said game; and conduct the game for the participating devices in order to determine an actual outcome; and a game outcome prediction controller configured to:

receive from a non-participating gaming device of said plurality of linked gaming devices at least one predicted outcome of said possible outcomes; and determine whether to make an award to one or more non-participating gaming devices based on said at least one predicted outcome and the actual outcome.

12. A gaming system as claimed in claim 11, and wherein the game is a linked game and each linked gaming device is configured to play a base game.

13. A gaming system as claimed in claim 12, wherein each linked gaming device is configured to play the same base game.

14. A gaming system as claimed in claim 12, and wherein said linked game controller is further configured to initiate the linked game in response to receiving at least two trigger events.

15. A gaming system as claimed in claim 11, and wherein where two devices of said plurality of gaming devices are determined to participate in the game, any other devices of the linked gaming devices are non-participating devices, and are eligible to predict which of the participating devices will win the game.

16. A gaming system as claimed in claim 11, and further comprising a participation module configured to apply an eligibility criterion to all players of the plurality of linked gaming devices, and determine that all eligible devices are to participate and that all ineligible players are non-participating devices able to select a predicted outcome for the game.

17. A gaming system as claimed in claim 11, and wherein the game outcome prediction controller is configured to make an award in respect of each predicted outcome which matches the actual outcome.

18. A gaming system as claimed in claim 11, wherein the game outcome prediction controller is configured to:

receive a bet amount in respect of each predicted outcome; and make any award based on the bet amount.

19. A gaming system as claimed in claim 11, and wherein the game outcome prediction controller is configured such that non-participating devices select a predicted outcome before the game is conducted.

20. A gaming system as claimed in claim 11, and wherein the game outcome prediction controller is configured such that non-participating devices make a predicted outcome during at least part of conduct of the game.

21. A gaming system as claimed in claim 20, wherein the game outcome prediction controller is configured to vary the award based on the progress of the game when the predicted outcome was made.

22. A game outcome prediction controller for a gaming system configured to play a game having a plurality of possible outcomes, said gaming system having a plurality of linked gaming devices, the game outcome prediction controller configured to:

(1) receive a first trigger signal from a first device of said linked gaming devices, (2) a second trigger signal from a second device of said linked gaming devices, (3) in response to receiving both said first trigger signal and said second trigger signal, trigger said game, (4) receive from a non-participating gaming device of said plurality of linked gaming devices at least one predicted outcome of said game in which said first gaming device and said second gaming device of the plurality of linked gaming devices participate; and determine whether to make an award to one or more non-participating devices based on said at least one predicted outcome and an actual outcome of the game.

23. A game outcome prediction controller as claimed in claim 22, configured to make an award in respect of each outcome which matches the actual outcome.

24. A game outcome prediction controller as claimed in claim 22, configured to:

receive a bet amount in respect of each predicted outcome; and make any award based on the bet amount.

25. A game outcome prediction controller as claimed in claim 22, configured such that non-participating devices only make a predicted outcome before the game is conducted.

26. A game outcome prediction controller as claimed in claim 22, configured such that non-participating devices make a predicted outcome during the game.

27. A game outcome prediction controller as claimed in claim 26, configured to vary the award based on the progress of the game when the predicted outcome was made.

* * * * *

UNITED STATES PATENT AND TRADEMARK OFFICE

CERTIFICATE OF CORRECTION

| | |
|---|---|
| PATENT NO. | : 8,882,583 B2 |
| APPLICATION NO. | : 13/246034 |
| DATED | : November 11, 2014 |
| INVENTOR(S) | : Thomas Samuel Barbalet et al. |

It is certified that error appears in the above-identified patent and that said Letters Patent is hereby corrected as shown below:

On the Title Page

Item (73) Assignee: Delete "Artistocrat Technologies Autralia Pty Limited (AU)"
and insert --Aristocrat Technologies Australia Pty Limited (AU)--

Signed and Sealed this
Seventeenth Day of March, 2015

Michelle K. Lee
*Director of the United States Patent and Trademark Office*